Nov. 18, 1930.  L. B. MARVIN  1,782,241
SEAT SUPPORT
Filed Feb. 18, 1929
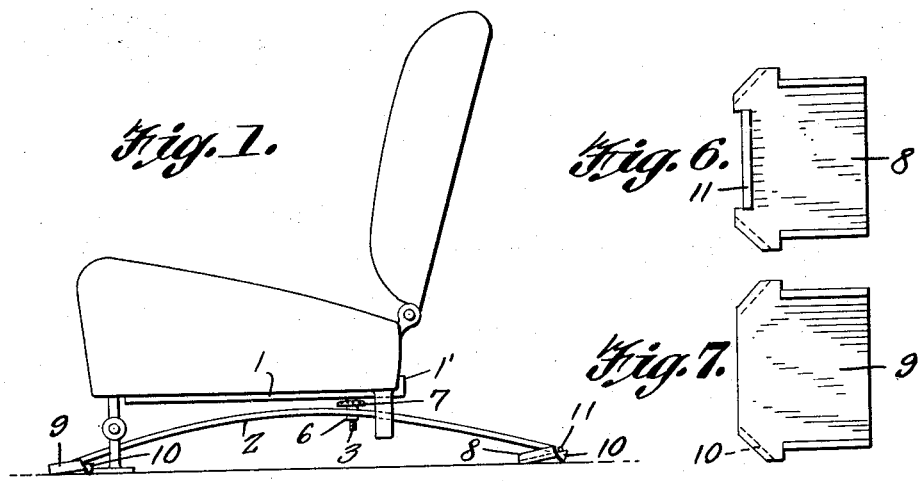
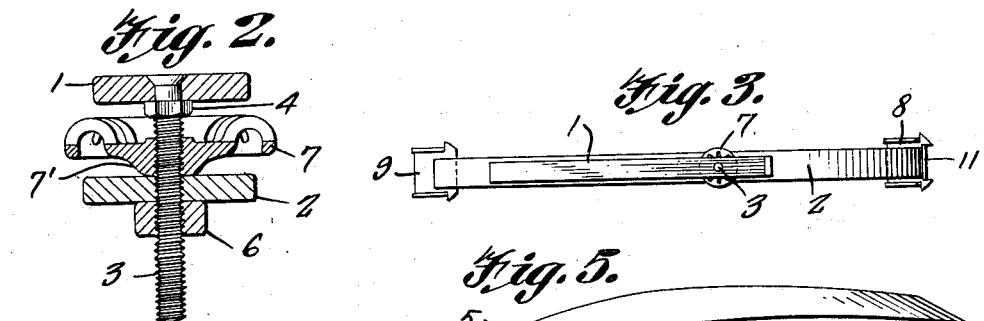
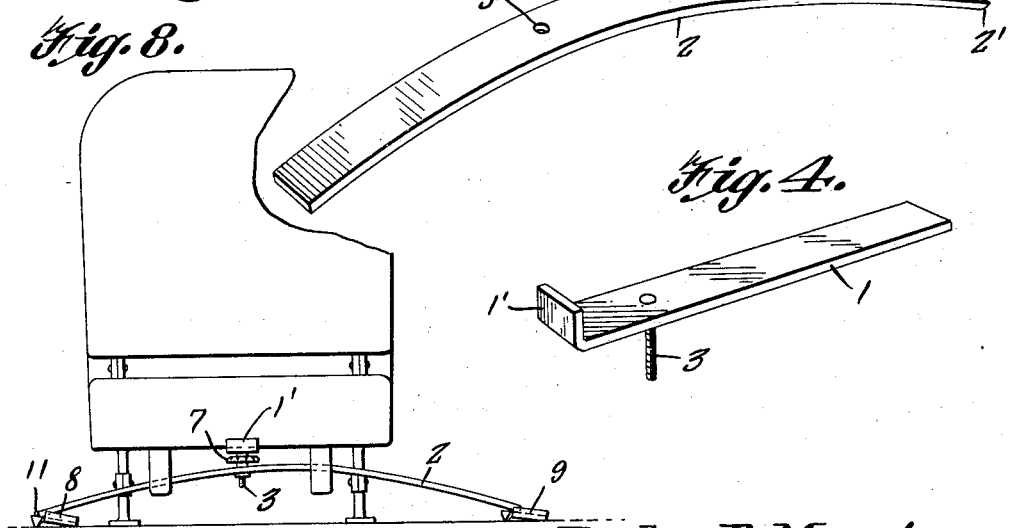
Lester B. Marvin, INVENTOR
BY Victor J. Evans ATTORNEY
WITNESS:

Patented Nov. 18, 1930

1,782,241

UNITED STATES PATENT OFFICE

LESTER B. MARVIN, OF PUEBLO, COLORADO

SEAT SUPPORT

Application filed February 18, 1929. Serial No. 340,814.

This invention relates to a support for a hinged or pivotally mounted automobile seat, such as used in coaches or sedans, the general object of the invention being to provide a resilient and adjustable support for the seat whereby the seat can be adjusted to suit the person using the same and the resilient feature of the device will act as a shock absorber so as to relieve the persons occupying the seats from jars and shocks and thus enable them to ride with great comfort.

Another object of the invention is to so form and arrange the parts that the device can be put in place very easily and quickly and without changing in any way the parts of the seat or of the vehicle.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a view showing the invention in use.

Figure 2 is a section on line 2—2 of Figure 1.

Figure 3 is a plan view of the device.

Figure 4 is a perspective view of the seat engaging bar.

Figure 5 is a view of the spring.

Figure 6 is a view of one of the floor plates.

Figure 7 is a view of the other floor plate.

Figure 8 is a rear view showing the invention placed sidewise of the seat instead of lengthwise, as in Figure 1.

As shown in these views, the device includes a seat engaging member 1 and a semi-elliptical spring 2. The member 1 carries a bolt 3, the head of which is countersunk in the top of the member 1 and a nut 4 on the bolt holds the bolt to the member 1. The bolt passes through a hole 5 formed in the spring to one side of the center of the length of the spring and a circular nut 6 on the bolt engages the under face of the spring. A hand wheel 7, having a centrally arranged threaded aperture therein for receiving the bolt, is located between the spring and the member 1, so that by turning this wheel in one direction or the other, the members 1 and 2 can be adjusted relative to each other. The member 1 is provided with a turned-up end 1' and this member is placed under the seat, as shown in Figure 1, with its turned-up end engaging the rear part of the seat so that the member is prevented from sliding on the seat. The spring 2 may extend lengthwise of the seat, as shown in Figure 1, or sidewise thereof, as shown in Figure 8. As shown in Figure 1, the long part of the spring should extend toward the front and when the spring is used, as in Figure 8, the long part of the spring should extend toward the second seat.

Shoes or floor plates 8 and 9 are provided for the ends of the spring, each plate being of channel shape, with the flanges at the sides of each plate cut and bent into horizontal position, with the outer corners of the plates bent downwardly to form points 10 so that these points will engage the floor of the vehicle and thus prevent the shoes or plates from slipping. The rear plate 8 is formed with an upstanding flange 11 at its rear end against which the rear end of the spring will abut and thus this end of the spring is held against movement. The other end of the spring is rounded, as shown at 2', so that this end slidingly engages the front plate 9 and can move thereon. The plates are arranged with their points at the rear when the device is used, as shown in Figure 1. As shown in Figure 8, the plates are so placed that the short arm engages the flanged plate 8 and the long arm engages the plate 9, the pointed ends of the plates facing in the same direction, as shown.

As shown in Figures 1 and 8, the device should be so adjusted that the rear legs of the seat are held off the floor by the device, so that the rear portion of the seat is supported by the spring and thus the spring will act to absorb shocks and jars and make comfortable riding for the occupant of the seat. There is no rebound to the spring as the weight of the seat and the occupant is carried at an eccentric point on the leaf spring so that the weight is off center. The rebound comes up sideways and will not bother the occupant. The bar or member 1 is held to the seat by lever action. The weight of the seat, coming on the short arm of the bar or member, throws the long arm against the seat bottom and holds it to the seat as securely as if it was bolted.

The under part of the wheel 4 is formed with a spherical part 7' for engaging the spring so that the member 1 can have rocking movement and the hole in the spring through which the bolt passes is large enough to give free play to the bolt. The off center position of the weight on the spring lengthens the life of the spring and the points on the floor plates hold the plates at an angle so that one end of the spring can readily slide thereon and the flanges on the plates prevent the spring from slipping off the plates. As before stated, the device not only forms a resilient support for the seat, but makes the seat adjustable to suit the person using the seat and this adjustable feature of the device makes it capable of use with different kinds and sizes of seats.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with a hinged or pivoted seat, a bar engaging the under side of the seat, a semi-elliptical spring having a hole therein to one side of the center, a bolt carried by the bar and passing through the hole, a hand wheel having a threaded aperture through which the bolt passes, said hand wheel being arranged between the bar and the spring whereby the space between the bar and spring can be adjusted.

2. In combination with a hanged or pivoted seat, a bar engaging the under side of the seat and having a bent-up rear end for engaging a portion of the rear of the seat, a semi-elliptical spring having a hole therein to one side of the center, a bolt carried by the bar and passing through the hole, a hand wheel having a threaded aperture through which the bolt passes, said hand wheel being arranged between the bar and the spring whereby the space between the bar and spring can be adjusted, said hand wheel having a spherical lower portion for engaging the spring.

3. In combination with a hinged or pivoted seat, a bar engaging the under side of the seat and having a bent-up rear end for engaging a portion of the rear of the seat, a semi-elliptical spring having a hole therein to one side of the center, a bolt carried by the bar and passing through the hole, a hand wheel having a threaded aperture through which the bolt passes, said hand wheel being arranged between the bar and the spring whereby the space between the bar and spring can be adjusted, said hand wheel having a spherical lower portion for engaging the spring and a pair of channel-shaped floor plates for receiving the ends of the spring, each plate having depending points at one end thereof and one of the plates having an upturned flange for engaging one end of the spring.

4. In combination with a hinged or pivoted seat, a bar engaging the under side of the seat and having a bent-up rear end for engaging a portion of the rear of the seat, a semi-elliptical spring having a hole therein to one side of the center, a bolt carried by the bar and passing through the hole, a hand wheel having a threaded aperture through which the bolt passes, said hand wheel being arranged between the bar and the spring whereby the space between the bar and spring can be adjusted, said hand wheel having a spherical lower portion for engaging the spring and a pair of channel-shaped floor plates for receiving the ends of the spring, each plate having depending points at one end thereof and one of the plates having an upturned flange for engaging one end of the spring, the opposite end of the spring being rounded on its under side to engage the plate.

5. In combination with a pivoted seat, a bar engaging the under side of the seat, a spring swivelly secured intermediate its ends to the bar and having portions which are adapted to serve as legs for the seat and means for adjusting the spring at its point of connection with the bar toward and away from said bar.

In testimony whereof I affix my signature.

LESTER B. MARVIN.